United States Patent
Akesson et al.

(10) Patent No.: US 11,261,510 B2
(45) Date of Patent: *Mar. 1, 2022

(54) CUTTING TOOL

(71) Applicant: SANDVIK INTELLECTUAL PROPERTY AB, Sandviken (SE)

(72) Inventors: Leif Akesson, Alvsjo (SE); Anders Stenberg, Hagersten (SE); Carl-Johan Maderud, Stockholm (SE); Susanne Norgren, Huddinge (SE); Elias Forssbeck Nyrot, Uppsala (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 154 days.

This patent is subject to a terminal disclaimer.

(21) Appl. No.: 16/487,128

(22) PCT Filed: Feb. 27, 2018

(86) PCT No.: PCT/EP2018/054798
§ 371 (c)(1),
(2) Date: Aug. 20, 2019

(87) PCT Pub. No.: WO2018/158243
PCT Pub. Date: Sep. 7, 2018

(65) Prior Publication Data
US 2021/0140018 A1 May 13, 2021

(30) Foreign Application Priority Data
Feb. 28, 2017 (EP) .................................... 17158407

(51) Int. Cl.
*B23B 27/14* (2006.01)
*C22C 29/08* (2006.01)
(Continued)

(52) U.S. Cl.
CPC ............... *C22C 29/08* (2013.01); *B22F 7/06* (2013.01); *C22C 29/005* (2013.01);
(Continued)

(58) Field of Classification Search
CPC ......... C22C 29/08; C22C 29/005; B22F 7/06; B22F 2005/001; B22F 2301/15;
(Continued)

(56) References Cited

U.S. PATENT DOCUMENTS

| 2002/0114981 A1 | 8/2002 | Andersson et al. |
| 2005/0126336 A1 | 6/2005 | Jansson et al. |
| 2015/0063930 A1 | 3/2015 | Hedin et al. |

FOREIGN PATENT DOCUMENTS

EP 2032731 A1 3/2009

OTHER PUBLICATIONS

Igor Konyashin et al: "1.15 Cemented Carbides for Mining, Construction and Wear Parts", Reference Module in Materials Science and Materials Engineering Comprehensive Hard Materials, Amsterdam: Elsevier, 2014—NL, pp. 425-451, Jan. 1, 2014.

*Primary Examiner* — Humera N. Sheikh
*Assistant Examiner* — John D Schneible
(74) *Attorney, Agent, or Firm* — Corinne R. Gorski

(57) ABSTRACT

A cutting tool made of a cemented carbide substrate of WC, a metallic binder phase and gamma phase is provided. The cemented carbide has a well distributed gamma phase and a reduced amount of abnormal WC grains. The cutting tool has a more predicted tool life and an increased resistance against plastic deformation.

9 Claims, 1 Drawing Sheet

(51) Int. Cl.
  *B22F 7/06* (2006.01)
  *C22C 29/00* (2006.01)
  *B22F 5/00* (2006.01)
  *C23C 28/04* (2006.01)

(52) U.S. Cl.
  CPC ..... *B22F 2005/001* (2013.01); *B22F 2301/15* (2013.01); *B22F 2302/10* (2013.01); *B23B 27/14* (2013.01); *B23B 2224/24* (2013.01); *B23B 2224/32* (2013.01); *B23B 2224/36* (2013.01); *C23C 28/044* (2013.01)

(58) Field of Classification Search
  CPC . B22F 2302/10; B23B 27/14; B23B 2224/24; B23B 2224/32; B23B 2224/36; C23C 28/044; Y10T 428/265
  USPC ............ 419/14, 18; 428/698, 701, 702, 336; 51/307, 309
  See application file for complete search history.

CUTTING TOOL

RELATED APPLICATION DATA

This application is a § 371 National Stage Application of PCT International Application No. PCT/EP2018/054798 filed Feb. 27, 2018 with priority to EP 17158407.1 filed Feb. 28, 2017.

The present invention relates to a cutting tool comprising a cemented carbide substrate containing gamma phase wherein the cemented carbide has an evenly distributed gamma phase and a reduced amount of abnormal WC grains.

BACKGROUND

Cutting tools comprising cemented carbide substrates containing gamma phase are known in the art.

There is always a strive to obtain tools that are more wear resistant and therefore last longer. However, there is also important that the tools have a predicted tool life, i.e. that the tools can be trusted to last for at least a certain amount of time in order to make production planning easier. It is common that one person is responsible for a large number of machines that are running cutting operations simultaneously.

Each machine represents either a green or red light on the screen depending on whether it is running or not. The cutting tools are, in order to maximize the production, replaced before they break. This is to avoid unexpected down time. To have a predicted minimum tool life will therefore make it easier to maximize production. Unexpected, early tool breakage will lead to unexpected down time and there is a big advantage to always have green lights until the planned replacement of tools.

One way to obtain a cutting tool with a more predictable tool life thus with less early breakages is to reduce the crack formation and to reduce the crack propagation rate by reduce the number of large defects.

One object of the present invention is to obtain a cutting tool with a reduced amount of early breakages in the cemented carbide.

Another object of the present invention is to obtain a cutting tool with an improved resistance against plastic deformation when used on machining operations.

DETAILED DESCRIPTION OF THE PRESENT INVENTION

Figure 1:
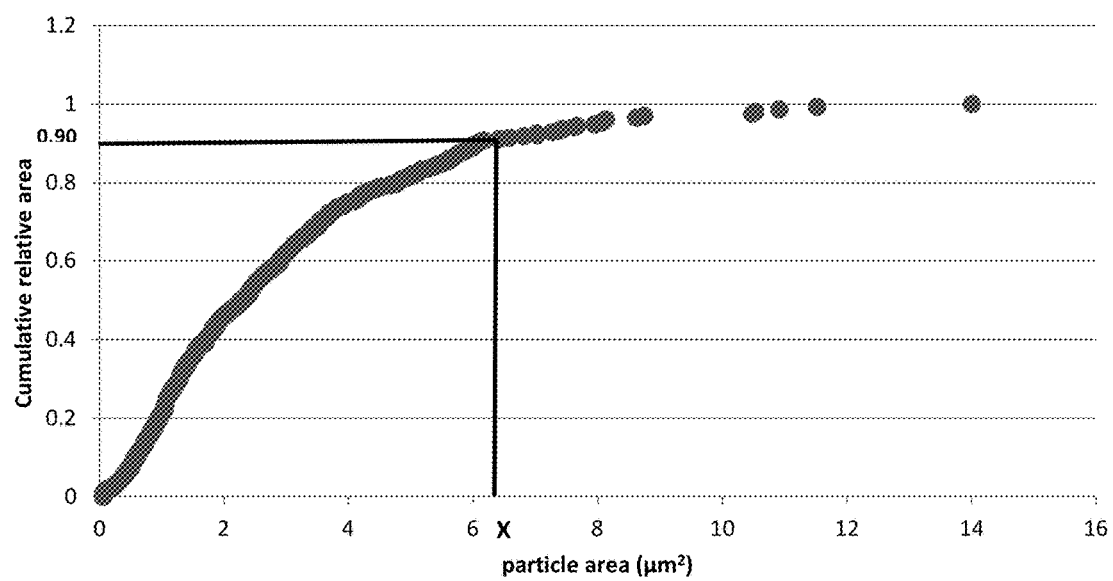
FIG. 1 show a cumulative plot where the cumulative relative area (y-axis), is plotted against the particle area (x-axis).

The present invention relates to a cutting tool comprising a cemented carbide substrate comprising WC, a metallic binder phase and gamma phase, where the cemented carbide has a well distributed gamma phase. The distribution of the a gamma phase is so that N is less than 80 µm², where $$N = X/Y$$

where X (µm²) is the particle area (x-axis) at the cumulative relative area of 0.90 (y-axis), in a cumulative plot (from 0 to 1) where the cumulative relative particle area of the gamma phase particles (y-axis) is plotted against the particle area (x-axis) and where Y is a correction factor $$Y = \frac{\text{area fraction of cubic carbides and cubic carbonitrides}}{\text{area fraction of total carbides and carbonitrides}}$$

where the relative cumulative plot and the area fractions are obtained from EBSD analysis.

Further, the cemented carbide have a reduced amount of abnormal WC grains so that the area fraction obtained from EBSD analysis of abnormal WC grains defined as $$\text{area fraction abnormal grains} = \frac{\text{total area of all } WC \text{ grains} > 10 \times aWC_{av}}{\text{total area of all } WC \text{ grains}}$$

is between 0 and 0.03.

The characterization of the cemented carbide according to the present invention is performed using Electron backscatter diffraction (EBSD). EBSD is an SEM method that steps the beam across the sample surface by a defined distance (the step size) and determines the phase and crystallographic orientation of the sample at each step from the diffraction pattern produced when the sample is tilted at 70° to the horizontal. This information can be used to produce maps of the sample microstructure which can be easily evaluated using the crystallographic information to determine the size and relative location of grain boundaries, phases and grains.

The cemented carbide should have as few abnormal WC grains as possible. By an abnormal WC grain is usually meant a WC grain that is several times larger than the average WC grain size. The amount of abnormal WC grains herein is determined from EBSD analysis of the cemented carbide material.

The area fraction of abnormal WC grains is defined as the area fraction of the WC grains that is larger than 10 times the average area for the WC grains, $aWC_{av}$, related to the total area of WC grains.

$$\text{area fraction abnormal grains} = \frac{\text{total area of all } WC \text{ grains} > 10 \times aWC_{av}}{\text{total area of all } WC \text{ grains}}$$

According to the present invention the area fraction of abnormal grains is from 0 to 0.03, preferably from 0 to 0.025, more preferably from 0 to 0.02.

The gamma phase, which is a solid solution of cubic carbides and/or carbonitrides, is formed during sintering from cubic carbides and/or carbonitrides and WC and can be described as (W,M)C or (W,M)(C,N) wherein M is one or more of Ti, Ta, Nb, Hf, Zr, Cr and V.

The amount of gamma phase is suitably from 3 to 25 vol %, preferably from 5 to 17 vol %. This can be measured in different ways e.g. by making an image analysis of either a Light Optical Microscope (LOM) image or a Scanning Electron Microscope (SEM) micrograph of a cross section of the substrate to calculate the average fraction of gamma phase. When the cemented carbide is provided with a gradient in the surface zone, the amount of gamma phase as given herein is measured in the bulk. The amount of gamma phase can also be retrieved from EBSD analysis.

In one embodiment of the present invention, the amount of Nb is between 0.2 to 1 wt %, the amount of Ta is between 2 to 3 wt % and the amount of Ti is between 1.6 to 2.1 wt % based on the total amount of the cemented carbide.

The distribution of gamma phase should be as even as possible. The EBSD analysis of the gamma phase has been performed on the gamma phase particles, i.e. not the gamma phase grains. Through processing the EBSD data it is possible to choose if particles or grains should be measured. By grain is herein meant a single crystal whereas a particle contains 2 or more grains in direct contact with each other.

According to the present invention, the gamma phase is well distributed with a controlled particle size.

The distribution of the gamma phase is determined by EBSD analysis and is given by the value N ($\mu m^2$), where:

$$N = X/Y$$

The cumulative relative particle area of the gamma phase particles (y-axis) from the EBSD analysis is plotted against the particle area (x-axis). See FIG. 1. From the cumulative plot, the particle area (x-axis) at the cumulative relative area of 0.90 (y-axis), value X ($\mu m^2$), is achieved. If no value matches 0.90 exactly, an average of the two values below and above 0.90 is used as X.

The value Y is a correction factor to correlate for different amounts of gamma phase in the cemented carbide. Y is the ratio between the area fraction of cubic carbides and cubic carbonitrides (gamma phase) divided by the total amount of carbides and carbonitrides, i.e. both WC (hexagonal) and gamma phase (cubic). The area fractions are obtained from the EBSD data.

$$Y = \frac{\text{area fraction of cubic carbides and cubic carbonitrides}}{\text{area fraction of total carbides and carbonitrides}}$$

According to the present invention the gamma phase distribution, N, is suitably less than 80 $\mu m^2$, preferably from 15 to 75 $\mu m^2$, more preferably from 35 to 70 $\mu m^2$.

In one embodiment of the present invention, the cemented carbide substrate comprises a binder phase enriched surface zone depleted of gamma phase.

The thickness of the surface zone is suitably from 10 to 35 $\mu m$. The thickness is measured between the surface of the substrate and the border between the gamma phase containing bulk and the surface zone which is depleted from gamma phase. In a SEM or LOM image this border is easy to identify since it is quite distinct. The measurements of the thickness of the surface zone should preferably be done on a flat surface, preferably on the flank face, not too close to the cutting edge. By that is herein meant that the measurements should be performed at least 0.3 mm from the cutting edge.

By binder enriched is herein meant that the binder phase content in the surface zone is at least 1.3 times the binder phase content in the bulk. The binder phase content in the surface zone is suitably measured at a depth of half the total thickness/depth of the surface zone. By bulk is herein defined as the area that is not the surface zone. All measurements performed on the bulk should be performed at an area not too close to the surface zone. By that is herein meant that any measurements done to the microstructure of the bulk should be performed at a depth of at least 200 $\mu m$ from the surface.

By depleted of gamma phase is herein meant that the surface zone contains no, or very few gamma phase particles, i.e. less than 0.5 area %.

The binder phase is suitably selected from one or more of Fe, Co and Ni, preferably Co, in an amount of 2 to 20 wt % of the sintered body, preferably from 4 to 12 wt % of the sintered body.

In one embodiment of the present invention, the Co content is between 4 to 9 wt %, preferably between 4.5 to 8 wt % of the sintered body.

In one embodiment of the present invention, when Cr is present in the cemented carbide, some of the Cr is dissolved in the binder phase.

The cemented carbide can also comprise other constituents common in the art of cemented carbides. When recycled material (PRZ) is used, that Zr, V, Zn, Fe, Ni and Al can also be present in small amounts.

In one embodiment of the present invention, the amount of Nb is between 0.2 to 1 wt %, the amount of Ta is between 2 to 3 wt %, the amount of Ti is between 1.6 to 2.1 wt % and the Co content is between 4.5 to 8 wt % based on the total amount of the cemented carbide. Further, N is less than 80 $\mu m^2$ and the area fraction of abnormal grains is from 0 to 0.03.

In one embodiment of the present invention, the cemented carbide insert is provided with a wear resistant CVD (Chemical Vapor Deposition) or PVD (Physical Vapor Deposition) coating.

In yet another embodiment of the present invention, the cemented carbide insert is provided with a wear resistant CVD coating.

In yet another embodiment of the present invention, the cemented carbide insert is provided with a wear resistant CVD coating comprising several layers, suitably at least a metal carbonitride layer and a $Al_2O_3$ layer, preferably at least one Ti(C,N) layer and $\alpha$-$Al_2O_3$ and optionally an outer TiN layer.

The coating can also be subjected to additional treatments known in the art, such as brushing, blasting etc.

By cutting tool is herein meant an insert, end mill or drill.

In one embodiment of the present invention, the cutting tool is an insert, preferably a turning insert.

In one embodiment of the present invention, the cemented carbide substrate is used for turning in steel, cast iron or stainless steel.

Example 1

Cemented carbide substrates were manufactured by first pre-milling recycled cemented carbide material (PRZ, recycled using the Zn-process) together with (Ta,Nb)C, (Ti,W)C, Ti(C,N) in a milling liquid of ethanol and water (9 wt % water). The ratio between powder and milling liquid was 4524 g powder/1 L milling liquid. The milling was performed in an agitated mill called LABSTAR from Netzsch which is a horizontal agitated mill where the slurry is circulated between the milling chamber and a holding tank. The slurry was milled at 1500 rpm to an accumulated energy of 0.36 kWh.

The amount of PRZ, i.e. recycled material is 40 wt % of the total powder weight. In Table 2, the composition in wt % for the PRZ used is shown. The rest of the raw materials are added in such amounts so that the composition in Table 1 is obtained.

After the pre-milling step, the WC, Co powders and PEG (poly ethylene glycol), were added to the slurry and milling liquid was added the slurry so that 10 kg powder/2.3 L milling liquid and all powders was then milled together at 1500 rpm to an accumulated energy of 1.18 kWh. The amount of PEG was 2 wt % of the total dry powder weight (PEG not included in the total dry powder weight).

The WC powder was a commercial WC powder from Wolfram Bergbau und Hütten AG called HTWC030 which is a high temperature carburized WC. The average particle size (FSSS) after ASTM-milling was 2.9 µm.

The slurry was then spray dried into agglomerates which were then subjected to a pressing operation in a hydraulic press from Fette to form green bodies.

The green bodies were then sintered by first performing dewaxing in H2 at up to 450° C., vacuum heating up to 1350° C. After that, a protecting atmosphere of flowing 20 mbar Ar and 20 mbar CO is introduced and then maintaining the temperature at 1450° C. for 1 h.

The cemented carbide achieved is hereinafter denoted Invention 1.

For comparison, cemented carbide substrates were manufactured in the same manner as Invention 1 with the differences that the powder weight in the pre-milling step was 4425 g, the second milling step was performed to an accumulated energy of 1.02 kWh and that a conventional WC (not high temperature carburized) with an average particle size (FSSS) after ASTM-milling of 7.15 µm was used. The cemented carbide achieved is hereinafter denoted Comparative 1.

The achieved materials, Invention 1 and Comparative 1, both have a binder phase enriched surface zone depleted from gamma phase, with a thickness of 19.8 and 22.3 µm respectively.

TABLE 1

|  | Co (wt %) | NbC (wt %) | TaC (wt %) | TiC (wt %) | TiN (wt %) | WC |
|---|---|---|---|---|---|---|
| Invention 1 | 5.35 | 0.47 | 2.88 | 1.88 | 0.40 | Balance |
| Comparative 1 | 5.35 | 0.47 | 2.88 | 1.88 | 0.40 | Balance |

TABLE 2

| W | Co | Nb | Ta | Ti | Cr | Zr | V | Zn | C | N | O |
|---|---|---|---|---|---|---|---|---|---|---|---|
| 82.11 | 8.10 | 0.72 | 1.63 | 1.16 | 0.12 | 0.09 | 0.007 | 0.001 | 5.74 | 0.06 | 0.14 |

The rest of the PRZ-powder (up to 100%) is trace amounts of Fe, Ni and Al.

Example 2 (Microstructure)

The microstructure of the sintered materials was also analyzed by EBSD. 4 images of 60*100 µm were used.

The inserts were prepared for electron backscatter diffraction (EBSD) characterization by polishing the cross section of the bulk material using mechanical polishing using a diamond slurry down to a diamond size of 1 µm followed by an ion polished step performed in an Hitachi E3500.

The prepared samples were mounted onto a sample holder and inserted into the scanning electron microscope (SEM). The samples were tilted 70° with respect to the horizontal plane and towards the EBSD detector. The SEM used for the characterization was a Zeiss Supra 55 VP, using a 240 µm objective aperture, applying "High current" mode and operated in high vacuum (HV) mode. The used EBSD detector was an Oxford Instruments Nordlys Detector operated using Oxford Instruments "AZtec" software version 3.1. EBSD data acquisitions were made by applying a focused electron beam on to the polished surfaces and sequentially acquiring EBSD data using a step size of 0.1 µm for 1000×600 µm measuring points. When performing EBSD analysis for this purpose, the number of images should be chosen so that the total area from which the EBSD data is obtained from should be at least 12000 µm².

The SEM settings

| Acceleration Voltage | 20 kV |
| Aperture Size | 240 µm |
| High current | On |
| Working distance | 8.5 mm |
| Detector insertion distance | 171 mm |

| Grouping | Group 1: Co (cubic) + Cubic carbide phase |
|---|---|
| Optimize Pattern |  |
| Binning | 2 × 2 |
| Gain | 15 |
| Frame Average | 2 |
| Number of frames | 200 |
| Static Background | On |
| Auto Background | On |
| Optimize Solver |  |
| Number of Bands | 9 |
| Hough Resolution | 90 |

-continued

| Grouping | Group 1: Co (cubic) + Cubic carbide phase |
|---|---|
| Detect | Edges |
| Advanced Fit | Off |
| Apply refinement | On |

Reference phases were:
WC (hexagonal), 59 reflectors, Acta Crystallogr., [ACCRA9], (1961), vol. 14, pages 200-201 Co (cubic), 68 reflectors, Z. Angew. Phys., [ZAPHAX], (1967), vol. 23, pages 245-249 Co (hexagonal), 50 reflectors, Fiz. Met. Metalloved, [FMMTAK], (1968), vol. 26, pages 140-143 Cubic carbide phase, TiC, 77 reflectors, J. Matter. Chem. [JMACEP], (2001), vol. 11, pages 2335-2339 reflectors Since these cemented carbides comprises two cubic phases, Co binder phase and gamma phase, care has to be taken that the phases are identified correctly, i.e. that the indexing is accurate. This can be done in several ways, one way is to, on the same sample, also do an EDS or backscatter image, which depends on the chemical composition of the phases and thereby shows the difference between the binder and the gamma phase, for comparison.

The EBSD data was collected in AZtec and analyzed in HKL Channel5 (HKL Tango version 5.11.20201.0), by Oxford instruments. Noise reduction was performed by removing wild spikes and performing zero solution extrapolation level 5. WC grains were determined with a critical misorientation angle of 5 degrees. Grain boundaries between the gamma phase grains were eliminated so that only the gamma phase particles were analyzed. This was done in Channel 5 by setting the critical misorientation to 90 degrees. All particles of less than 4 pixels (0.04 $\mu m^2$) were eliminated as noise.

The distribution of the gamma phase is determined by EBSD analysis and is given by the value N ($\mu m^2$), where:

$$N = X/Y$$

The cumulative relative particle area of the gamma phase particles (y-axis) from the EBSD analysis is plotted against the particle area (x-axis). From the cumulative plot, the particle area (x-axis) at the cumulative relative area of 0.90 (y-axis), value X ($\mu m^2$), is achieved. If no value matches 0.90 exactly, an average of the two values below and above 0.90 is used as X.

The value Y is a correction factor to correlate for different amounts of gamma phase in the cemented carbide. Y is the ratio between the area fraction of cubic carbides and cubic carbonitrides (gamma phase) divided by the total amount of carbides and carbonitrides, i.e. both WC (hexagonal) and gamma phase (cubic). The area fractions are obtained from the EBSD data.

$$Y = \frac{\text{area fraction of cubic carbides and cubic carbonitrides}}{\text{area fraction of total carbides and carbonitrides}}$$

The area fraction of abnormal WC grains is defined as the area fraction of the WC grains that is larger than 10 times the average area for the WC grains, $aWC_{av}$, related to the total area of WC grains.

$$\text{area fraction abnormal grains} = \frac{\text{total area of all } WC \text{ grains} > 10 \times aWC_{av}}{\text{total area of all } WC \text{ grains}}$$

The results can be seen in Table 3.

In Table 3, the Coercivity (Hc) and the weight specific magnetic saturation magnetism is shown.

The coercivity and the weight specific magnetic saturation magnetism were measured using a Foerster Koerzimat CS1.096.

TABLE 3

|  | Hc (kA/m) | weight specific magnetic saturation magnetism ($10^{-6} Tm^3/kg$) | Area fraction of abnormal WC grains | Gamma phase distribution, N ($\mu m^2$) |
|---|---|---|---|---|
| Invention 1 | 15.25 | 9.37 | 0.0162 | 41.7 |
| Comparative 1 | 15.06 | 9.19 | 0.0415 | 45.0 |

Example 3

Cemented carbide substrates were manufactured by first pre-milling recycled cemented carbide material (PRZ) together with (Ta,Nb)C, (Ti,W)C, Ti(C,N) and PEG (poly ethylene glycol) in in a milling liquid of ethanol and water (9 wt % water). The ratio between powder and milling liquid was 5481 g powder/1.35 L. The milling was performed in an agitated mill called LABSTAR from Netzsch which is a horizontal agitated mill where the slurry is circulating between the milling chamber and a holding tank. The slurry was milled at 1500 rpm to an accumulated energy of 0.56 kWh.

The amount of PEG was 2 wt % of the total dry powder weight (PEG not included in the total dry powder weight).

After the pre-milling step, the WC and Co powders were added to the slurry and milling liquid was added to the slurry so that 10 kg powder/2.3 L milling liquid and all powders were then milled at 1150 rpm to an accumulated energy of 1.15 kWh.

The slurry was then spray dried into agglomerates which were then subjected to a pressing operation in a hydraulic press from Fette to form green bodies.

The amount of PRZ, i.e. recycled material, was 50 wt % of the total powder weight. In Table 5, the composition in wt % for the PRZ batch 611 used is shown. The rest of the raw materials are added in such amounts so that the composition in Table 4 is obtained.

The green bodies were then sintered by first performing dewaxing in $H_2$ at up to 450° C., vacuum heating up to 1350° C. After that, a protecting atmosphere of flowing 20 mbar Ar and 20 mbar CO is introduced and then maintaining the temperature at 1450° C. for 1 h.

The WC powder was a commercial WC powder from Wolfram Bergbau und Hütten AG called HTWC040 which is a high temperature carburized WC. The average particle size (FSSS) after ASTM-milling was 3.9 $\mu m$.

The cemented carbide substrate is denoted Invention 2.

For comparison, a substrate, Comparative 2, was manufactured by first milling all raw material powders in a conventional ball mill for 14 h, i.e. no pre-milling is performed.

The raw materials were the same as in for Invention 2, with the differences that another batch of PRZ was used, batch 576, see Table 5, and that a conventional WC (not high temperature carburized) was used with an average particle size (FSSS) after ASTM-milling of 4.80 $\mu m$. The rest of the raw materials are added in such amounts so that the composition in Table 4 is obtained.

The slurry was then spray dried into agglomerates which were then subjected to a pressing operation in a hydraulic press from Fette to form green bodies which was subsequently sintered in the same manner as for Invention 2. This cutting tool is denoted Comparative 2.

Both substrates, Invention 2 and Comparative 2, was then provided with the same CVD coating comprising a TiCN layer and an α-Al$_2$O$_3$ layer deposited using conventional techniques.

The achieved substrates, Invention 2 and Comparative 2, both have a binder phase enriched surface zone depleted from gamma phase, with a thickness of 23 and 25 μm respectively, as measured on the coated inserts.

TABLE 4

| | Co (wt %) | NbC (wt %) | TaC (wt %) | TiC (wt %) | TiN (wt %) | WC |
|---|---|---|---|---|---|---|
| Invention 2 | 7.20 | 0.46 | 2.87 | 1.87 | 0.40 | Balance |
| Comparative 2 | 7.20 | 0.46 | 2.87 | 1.87 | 0.40 | Balance |

TABLE 5

| Batch | W | Co | Nb | Ta | Ti | Cr | Zr | V | Zn | C | N | O |
|---|---|---|---|---|---|---|---|---|---|---|---|---|
| 611 | 82.04 | 8.29 | 0.72 | 1.57 | 1.12 | 0.13 | n.a. | 0.008 | 0.001 | 5.76 | 0.06 | 0.18 |
| 576 | 82.53 | 8.16 | 0.40 | 1.45 | 1.21 | 0.13 | 0.02 | 0.005 | 0.001 | 5.74 | 0.06 | 0.18 |

The rest of the PRZ-powder (up to 100%) is trace amounts of Fe, Ni and Al.

Example 4 (Microstructure)

The microstructure of the sintered materials from Example 3 was analyzed in the same way as in Example 2 with the difference that 6 images of 60*40 μm were used.

The results from the measurements can be seen in Table 6 below.

In Table 6, the coercivity (Hc) and the weight specific magnetic saturation magnetism is also given.

TABLE 6

| | Hc (kA/m) | weight specific magnetic saturation magnetism (10$^{-6}$Tm$^3$/kg) | Area fraction of abnormal WC grains | Gamma phase distribution, N (μm$^2$) |
|---|---|---|---|---|
| Invention 2 | 14.37 | 12.7 | 0.0197 | 40.0 |
| Comparative 2 | 13.89 | 13.0 | 0.0480 | 84.3 |

Example 5 (Working Example)

The cutting tools from Examples 3 and 4 were also tested in a longitudinal turning operation in steel, SS1312 with a cutting fluid. The following parameters were used:

V$_c$=80 m/min
f=0.15 mm/r increasing with I=1.0
a$_p$=1.5 mm
Number of tested cutting edges was 15.
The tool life criterion was edge breakage.
The results are displayed in Table 7.

TABLE 7

| | Time to first break (min) |
|---|---|
| Invention 2 | 0.75 |
| Comparative 2 | 0.50 |

Figure 2:
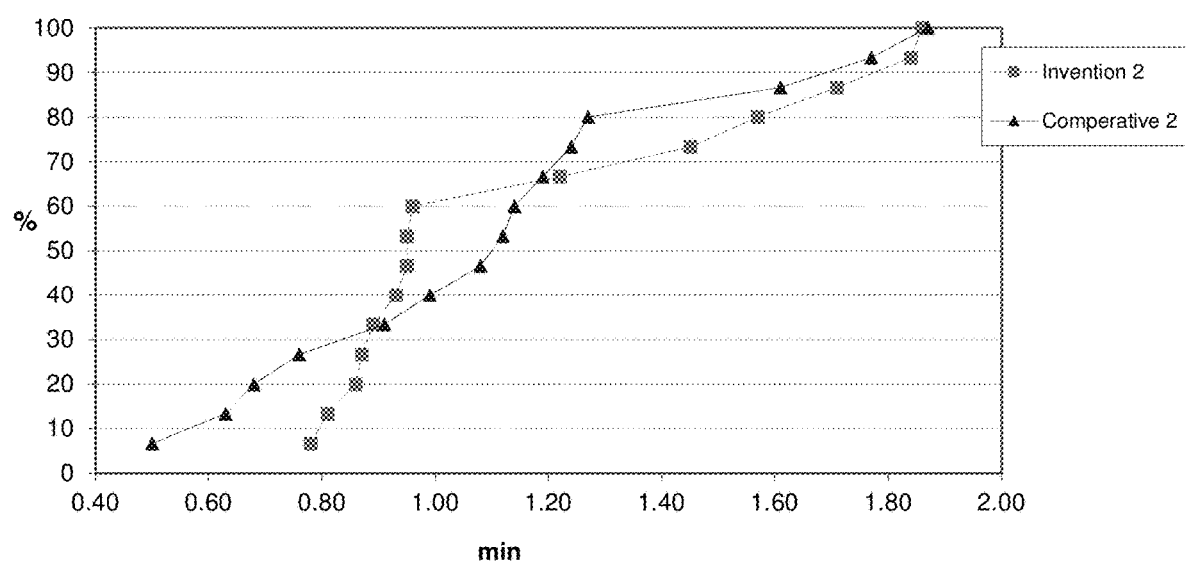
FIG. 2 shows a diagram showing the results from the toughness test in Example 5.

The results show that the time to first break of a cutting edge (out of 15 tested edges) has been increased. In the FIG. 2, where the results of all 15 edges has been shown, it can be seen that for Invention 2, a large number of cutting edges breaks within seconds from each other, whereas the tool life for Comparative 2, has a more scattered look.

Example 6 (Working Example)

The cutting tools from Examples 3 and 4 were also tested in an interrupted turning operation in steel, SS1672 with a cutting fluid. The following parameters were used:

V$_c$=220 m/min
f=0.3 mm/r
a$_p$=3 mm

Number of tested cutting edges was 3. The edges were investigated after 7, 8 and 9 cycles respectively, and the wear was classified as good, i.e. not much wear, small frittering and then chipping of the cutting edge.

The results are shown in Table 8.

TABLE 8

| | After 7 cycles | After 8 cycles | After 9 cycles |
|---|---|---|---|
| Invention 2 | ok | ok | Small frittering |
| | Chipping | Chipping | Chipping |
| | ok | Small frittering | Chipping |
| Comparative 2 | Chipping | Chipping | Chipping |
| | Small frittering | Chipping | Chipping |
| | Small frittering | Small frittering | Chipping |

It can clearly be seen that Invention 2 has an increased resistance against chipping than Comparative 2.

Example 7

Cemented carbide substrates were manufactured by first pre-milling recycled cemented carbide material (PRZ) together with (Ta,Nb)C, (Ti,W)C, Ti(C,N) in a milling liquid of ethanol and water (9 wt % water). The ratio between powder and milling liquid was 232 kg powder/80 L milling liquid in an agitated mill called LMZ10 from Netzsch which is a horizontal agitated mill where the slurry is circulating between the milling chamber and a holding tank. The slurry was milled at 650 rpm to an accumulated energy of 30 kWh.

The amount of PRZ, i.e. recycled material is 20 wt % of the total powder weight. In Table 10, the composition in wt % for the PRZ used is shown, batch no. 828. The rest of the raw materials are added in such amounts so that the composition in Table 9 is obtained.

After the pre-milling step, the WC, Co powders and PEG (poly ethylene glycol), were added to the slurry and milling liquid was added the slurry so that 800 kg powder/160 L milling liquid and all powders was then milled at 650 rpm together to an accumulated energy of 90 kWh.

The amount of PEG was 2 wt % of the total dry powder weight (PEG not included in the total dry powder weight).

The WC powder was a high temperature carburized WC called HTWC040 purchased from Wolfram Bergbau und Hütten AG. The average particle size (FSSS) after ASTM-milling was 3.9 µm.

The slurry was then spray dried into agglomerates which were then subjected to a pressing operation in a hydraulic press from Fette to form green bodies.

The green bodies were then sintered by first performing dewaxing in H2 at up to 450° C., vacuum heating up to 1350° C. After that, a protecting atmosphere of flowing 20 mbar Ar and 20 mbar CO is introduced and then maintaining the temperature at 1450° C. for 1 h.

The cemented carbide achieved is herein after denoted Invention 3.

For comparison, a substrate, Comparative 3, was manufactured by first manufacture cemented carbide substrate by milling all raw material powders in a conventional ball mill for 11 h, i.e. no pre-milling is performed.

The raw materials were the same as in for Invention 3, with the differences that 15 wt % of the total powder weight of another batch of PRZ was used, batch 757, see Table 10, and that a conventional WC (not high temperature carburized) was used with an average particle size (FSSS) after ASTM-milling of 7.0 µm.

The amounts of the other raw materials were so that the composition according to Table 9 was achieved.

The cemented carbide achieved is herein after denoted Comparative 3.

TABLE 9

|  | Co (wt %) | NbC (wt %) | TaC (wt %) | TiC (wt %) | TiN (wt %) | WC |
|---|---|---|---|---|---|---|
| Invention 3 | 10.00 | 1.35 | 3.55 | 2.62 | 0.38 | Balance |
| Comparative 3 | 10.00 | 1.35 | 3.55 | 2.56 | 0.44 | Balance |

TABLE 10

| Batch | W | Co | Nb | Ta | Ti | Cr | Zr | V | Zn | C | N | O |
|---|---|---|---|---|---|---|---|---|---|---|---|---|
| 828 | 81.5 | 8.83 | 0.66 | 1.58 | 1.04 | 0.079 | 0.022 | 0.007 | 0.001 | 5.73 | 0.06 | 0.17 |
| 757 | 82.1 | 7.99 | 0.62 | 1.68 | 1.31 | 0.13 | 0.045 | 0.012 | 0.001 | 5.74 | 0.06 | 0.22 |

The rest of the PRZ-powder (up to 100%) is trace amounts of Fe, Ni and Al.

The slurry was then spray dried into agglomerates which were then subjected to a pressing operation in hydraulic press from Fette to form green bodies.

The achieved materials, Invention 3 and Comparative 3, both have a binder phase enriched surface zone depleted from gamma phase, with a thickness of 22 and 23 µm respectively.

Example 8 (Microstructure)

The microstructure of the sintered materials in Example 7 was analyzed in the same way as in Example 2.

The results from the measurements can be seen in Table 11 below.

In Table 11, the Coercivity (Hc) and the weight specific magnetic saturation magnetism is also given.

TABLE 11

|  | Hc (kA/m) | weight specific magnetic saturation magnetism ($10^{-6} Tm^3/kg$) | Area fraction of abnormal WC grains | Gamma phase distribution, N ($\mu m^2$) |
|---|---|---|---|---|
| Invention 2 | 11.66 | 16.9 | 0.0139 | 66.6 |
| Comparative 2 | 11.55 | 16.5 | 0.0458 | 108.4 |

Example 9 (Working Example)

The inserts made according to Example 7, Invention 3 and Comparative 3, were both coated with the same CVD coating comprising a TiCN layer and an α-Al$_2$O$_3$ layer deposited using conventional techniques. The coated inserts were tested in a facing operation under dry conditions. The work piece material was steel, SS2541, with the following conditions:

Vc 160 m/min
f 0.3 mm/rev
a$_p$ 2 mm
Tool life criterion: Vb≥0.5 mm on the main cutting edge.
The results are shown in Table 12.

TABLE 12

|  | Average Tool Life (min) |
|---|---|
| Invention 3 | 91 |
| Comparative 3 | 53 |

The invention claimed is:

1. A cutting tool comprising a cemented carbide substrate comprising WC, a metallic binder phase and a gamma phase, wherein the cemented carbide has a well-distributed gamma phase so that a gamma phase distribution, N, is less than 80 µm$^2$, wherein:

$$N = X/Y$$

where X (µm$^2$) is a particle area (x-axis) at a cumulative relative particle area of 0.90 (y-axis), in a cumulative plot, wherein the cumulative relative particle area of gamma phase particles (y-axis) is plotted against the particle area (x-axis), and where Y is a correction factor:

$$Y = \frac{\text{area fraction of cubic carbides and cubic carbonitrides}}{\text{area fraction of total carbides and carbonitrides}}$$

wherein a relative cumulative plot and area fractions are obtained from EBSD analysis;

and wherein an area fraction obtained from EBSD analysis of abnormal WC grains is between 0 and 0.03 and is defined as:

$$\text{area fraction abnormal grains} = \frac{\text{total area of all } WC \text{ grains} > 10 \times aWC_{av}}{\text{total area of all } WC \text{ grains}}$$

wherein the total area of $>10 \times aWC_{av}$ is the area fraction of the WC grains that is larger than 10 times an average area for the WC grains.

2. The cutting tool according to claim 1, wherein an amount of the gamma phase is between 3 to 25 vol. %.

3. The cutting tool according to claim 1, wherein the gamma phase distribution N is between 15 and 75 µm².

4. The cutting tool according to claim 1, wherein the area fraction of abnormal WC grains is between 0 and 0.025.

5. The cutting tool according to claim 1, wherein an amount of the metallic binder phase is 2 to 20 wt. % of the cemented carbide substrate.

6. The cutting tool according to claim 1, wherein the metallic binder phase is Co in an amount of between 4 to 12 wt. % of the cemented carbide substrate.

7. The cutting tool according to claim 1, wherein the cemented carbide substrate includes a binder phase enriched surface zone depleted of gamma phase, wherein a thickness of the surface zone is between 10 and 35 µm.

8. The cutting tool according to claim 1, wherein the gamma phase is a solid solution of cubic carbides and/or carbonitrides, (W,M)C or (W,M)(C,N), wherein M is one or more of Ti, Ta, Nb, Hf, Zr, Cr and V.

9. The cutting tool according to claim 1, wherein the cemented carbide substrate is provided with a coating.

* * * * *